United States Patent
Weinrich et al.

(10) Patent No.: US 8,117,300 B2
(45) Date of Patent: Feb. 14, 2012

(54) SUPPORTING BOTH ASYNCHRONOUS AND SYNCHRONOUS DATA TRANSFERS BETWEEN PRODUCTION EVENT INFORMATION SOURCES AND A PRODUCTION INFORMATION DATABASE

(75) Inventors: Steven M. Weinrich, York, PA (US); James C. Long, York, PA (US); Eric P. Grove, Dallastown, PA (US); Don R. Tunnell, Perkiomenville, PA (US); George E. Bachman, Fallston, MA (US)

(73) Assignee: Invensys Systems, Inc, Foxboro, MA (US)

( * ) Notice: Subject to any disclaimer, the term of this patent is extended or adjusted under 35 U.S.C. 154(b) by 945 days.

(21) Appl. No.: 11/411,438

(22) Filed: Apr. 25, 2006

(65) Prior Publication Data

US 2006/0259911 A1   Nov. 16, 2006

Related U.S. Application Data

(60) Provisional application No. 60/675,037, filed on Apr. 25, 2005.

(51) Int. Cl.
*G06F 15/173* (2006.01)
(52) U.S. Cl. ........... 709/224; 709/223; 714/39; 370/252
(58) Field of Classification Search .................. 709/224, 709/223; 370/252; 714/39
See application file for complete search history.

(56) References Cited

U.S. PATENT DOCUMENTS

| | | | |
|---|---|---|---|
| 6,496,827 B2 * | 12/2002 | Kozam et al. .......................... | 1/1 |
| 6,738,775 B2 | 5/2004 | Asherman | |
| 7,007,038 B1 * | 2/2006 | Kazemi ................................. | 1/1 |
| 7,024,593 B1 | 4/2006 | Budd et al. | |
| 2003/0055747 A1 * | 3/2003 | Carr et al. ......................... | 705/27 |
| 2003/0101107 A1 * | 5/2003 | Agarwal et al. ................... | 705/28 |
| 2003/0158795 A1 * | 8/2003 | Markham et al. ................ | 705/28 |
| 2005/0114369 A1 | 5/2005 | Gould et al. | |
| 2005/0223368 A1 * | 10/2005 | Smith et al. .................... | 717/128 |
| 2006/0236351 A1 * | 10/2006 | Ellerbrock et al. .............. | 725/81 |

OTHER PUBLICATIONS

Windows CE 3.0 Application Programming Grattan, Nick Prentice-Hall, Inc. Copyright 2001.*
Microsoft SQL Server 2000 Administrator's Companion Garcia, Reding, Whalen, Deluca Minrosoft Press Copyright 2000.*
PCT International Search Report for PCT/US06/15810 dated Jun. 7, 2007.
Written Opinion of the International Searching Authority dated Jun. 7, 2007.

(Continued)

*Primary Examiner* — Thu Ha Nguyen

(57) ABSTRACT

A production information reporting/recording system is disclosed herein including a number of features to ensure efficient, flexible and reliable recording of production data in a manufacturing system. Such features include validating the content of event messages to ensure compliance of event report information with a standard. The system also supports caching IDs associated with particular aspects of an event message (e.g., a production request, a process segment) as well as a unique ID corresponding to the ID assigned by the production event database to reduce the need to access the database when assigning unique database IDs to received events. The production event messaging system also supports both asynchronous and synchronous transactional messaging between the sources of events and the production database service. Furthermore, the system supports including extensions to a base production message schema through the inclusion of metadata that designates a particular production server to parse and apply/store the extension information.

12 Claims, 9 Drawing Sheets

OTHER PUBLICATIONS

Supplemental European Search for EP 06 75 1488 mailed on Aug. 10, 2010.
Anonymous: "Wonderware Production Events Module User Guide—Revision A" Invensys Systems, Inc. Jun. 20, 2005, XP002587515, Retrieved from the Internet:, URL:http://www.pacwest.wonderware.com/web/news/NewsDetails.aspx?NewsID=167 [retrieved on Jun. 16, 2010] the whole document. Retrieved from the Internet: URL:http://www.pacwest.wonderware.com/web/news/NewsDetails.aspx?NewsID=167 [retrieved on Jun. 16, 2010] p. 2 Jun. 20, 2005, XP002587516—Anonymous "Production Events Module v1.0 available" Wonderware PacWest Technical News.
Anonymous: "IndustrialSQL Server 8.0" Internet Citation Dec. 23, 2004, XP002311924 Retrieved from the Internet: URL:http://web.archive.org/web/20021001201810/www.wonderware.com/products/historian/ insql [retrieved on Dec. 23, 2004] the whole document.

* cited by examiner

| Event Name / Req. Attributes | Location | Lot | Material | Serial Number | Sublot |
|---|---|---|---|---|---|
| Material Consumable Actual | X | | X | | |
| Material Consumed Actual | X | X | X | X | X |
| Material Produced Actual | X | X | X | X | X |
| Material Moved Actual | X | X | X | X | X |

SUPPORTING BOTH ASYNCHRONOUS AND SYNCHRONOUS DATA TRANSFERS BETWEEN PRODUCTION EVENT INFORMATION SOURCES AND A PRODUCTION INFORMATION DATABASE

CROSS-REFERENCE TO RELATED APPLICATIONS

This application claims the priority benefit of Weinrich et al., U.S. Provisional Patent Application Ser. No. 60/675,037, filed on Apr. 25, 2005, entitled "RECORDING AND TRACING NON-TRENDING PRODUCTION DATA AND EVENTS IN AN INDUSTRIAL PROCESS CONTROL ENVIRONMENT," the contents of which are expressly incorporated herein by reference in their entirety, including any references therein.

This application relates to Weinrich et al., U.S. patent application Ser. No. 11/412,158, filed on Apr. 25, 2006, entitled "VALIDATING INFORMATION WITHIN PRODUCTION EVENT MESSAGES FOR RECORDING NON-TRENDING PRODUCTION DATA AND EVENTS," the contents of which are expressly incorporated herein by reference in their entirety, including any references therein.

This application relates to Weinrich et al., U.S. patent application Ser. No. 11/412,063, filed on Apr. 25, 2006, entitled "CACHING IDENTIFICATIONS AND ASSOCIATED PRODUCTION DATABASE GUIDS FOR EXPEDITED ACQUISITION OF LINKING INFORMATION CONTAINED WITHIN MULTIPLE DISTINCT PRODUCTION DATABASE TABLES," the contents of which are expressly incorporated herein by reference in their entirety, including any references therein.

This application relates to Weinrich et al., U.S. patent application Ser. No. 11/411,439, filed on Apr. 25, 2006, entitled "SUPPORTING EXTENSIONS TO PRODUCTION EVENT MESSAGE SCHEMES VIA PRODUCTION DATABASE SERVER VERSIONING," the contents of which are expressly incorporated herein by reference in their entirety, including any references therein.

FIELD OF THE INVENTION

The present invention generally relates to the field of computerized industrial process control systems. More particularly, the invention concerns collecting/processing non-trending process data and ensuring that such information is stored in long-term storage in accordance with an industry standard specification (e.g., ISA-95).

BACKGROUND

Industry increasingly depends upon highly automated data acquisition and control systems to ensure that industrial processes are run efficiently, safely and reliably while lowering their overall production costs. Data acquisition takes a variety of forms, including trending and non-trending. Trending data generally comprises the type acquired when a number of sensors measure aspects of an industrial process and periodically report their measurements back to a data collection and control system. By way of example the trending data produced by a sensor/recorder include: a temperature, a pressure, a pH, a mass/volume flow of material, a tallied inventory of packages waiting in a shipping line. If one or more pieces of trending data for a process variable are not stored, they can generally be estimated by observing the values assigned to the variable before and after the lost values, and then interpolating between the points.

Non-trending data, on the other hand, does not follow a pattern from point to point, and therefore cannot be estimated from nearest neighbor data points. Production data identifying general production requests (e.g., create a batch of chocolate milk) and tasks performed within the scope of each general production request, is an example of non-trending data. In view of the inability to estimate the values attributed to lost non-trending data, specialized databases, referred to as production event servers, have been developed to receive and maintain detailed production event histories.

A production event is a discrete event in time that occurs during a production process, usually involving a process measurement, material, equipment, personnel, or other manufacturing resource, that may be of interest at a later date. The following events are defined under the ISA 95 standard: material consumed actual, material produced actual, material moved actual, material consumable actual, production data, equipment actual, and personnel actual.

SUMMARY OF THE INVENTION

The present invention comprises a production events information recording system for use in a manufacturing environment. The system includes a number of enhancements to a production events information system that includes a production database comprising a set of tables for storing production event information generated by a manufacturing/production system.

The production event information is provided by a production event object that generates, in response to a triggering production event, a production event message including a set of data corresponding to a production event. Production database services process the production event message generated by the production event object. The production services include a production server for processing information content within the production event message prior to storing the set of data corresponding to the production event in the production database.

The production information reporting/recording system disclosed herein includes a number of features that ensure efficient, flexible and reliable recording of production data. One enhancement to the production event information system supports both asynchronous and synchronous transactional messaging between the sources of events and the production database service. Furthermore, the system supports extensions to a base production message schema. In a particular embodiment, support for extensions is provided through the inclusion of metadata extension information in a production message that designates a particular production server to parse and apply/store the production message including the extension information.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE DRAWINGS

Figure 1:
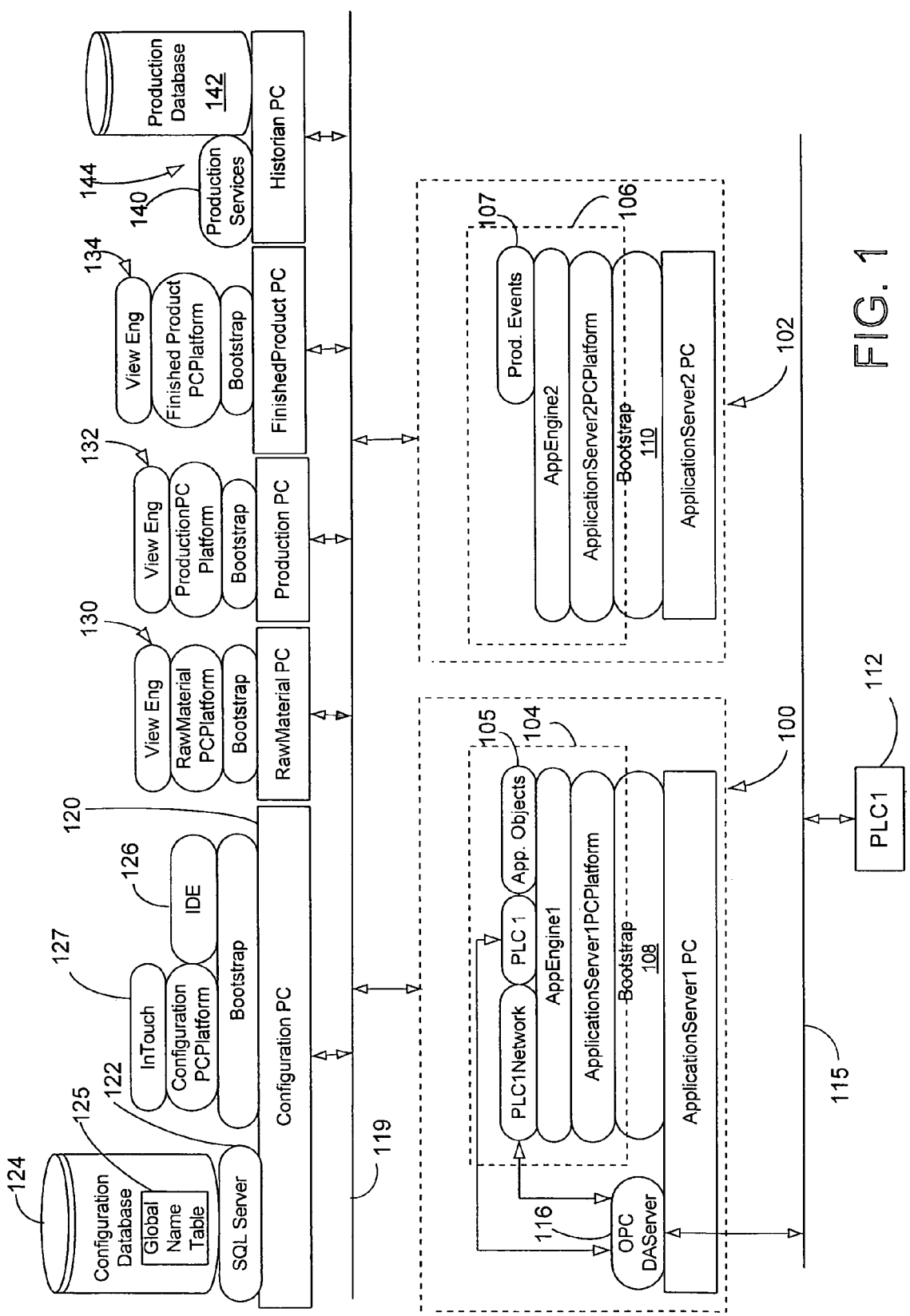
FIG. 1 is a schematic diagram depicting an exemplary supervisory process control development and runtime environment incorporating multi-layered hosting/hierarchical relationships between components.

A production events information reporting/recording system is disclosed herein that addresses the need to reliably store manufacturing and production information in an enterprise or portions thereof. The system disclosed herein supports traceability of production events associated with manufacturing processes. The system includes a set of production event objects and associated services for capturing and storing production event data in a set of tables defined within a production database according to the ISA-95 standard for data and transactions between production facilities and business systems. The illustrative production events information reporting and recording facility described herein is based upon the World Batch Forum (WBF) Business to Manufacturing Markup Language V2 specification, the contents of which are expressly incorporated herein by reference in their entirety including any references cited therein.

In the illustrative example, production event modules generate messages triggered by production events. The messages contain data about the event. The event data is configured at the object level an integrated design environment (IDE). Event messages are sent using either of two available transfer modes: (1) asynchronously (Without Response), or (2) synchronously (With Response). The production event messages are parsed, validated, and then written to a production database. Validation, as well as other enhanced functionality is supported by an extensible message schema arrangement that supports versioning of event message parsers on the server side.

The production event information reporting/recording system thus supports providing answers to a variety of important production questions. Such as How much product was made?
What component materials went into each unit of a final product?
What other products used the same component materials?
When was a particular product/lot produced?
What equipment was used to process a product?
Which operator was responsible for the equipment during processing of a particular product?
What basic resources (water, energy, etc.) were consumed during the processing of a particular product?

More complex questions for which answers are provided by accessing the contents of the production database include:

How much input material were used vs. how much output material was produced (mass balance)?
What were the values of some key product attributes at a particular inspection point in the process of making the product?
Which specific tooling was in the equipment that processed the product?
Which runs of this product:
  went through the same equipment?
  were run by the same operator?
  used the same input materials?

The following description of an exemplary production event information reporting/recording system is based on embodiments of the invention and should not be taken as limiting the invention with regard to alternative embodiments that are not explicitly described herein. By way of example, the present invention is incorporated within a supervisory process control and manufacturing information environment wherein individual data sources are represented by application objects. An example of such system is described in detail in Resnick et al., U.S. application Ser. No. 10/179,668 filed on Jun. 24, 2002, for SUPERVISORY PROCESS CONTROL AND MANUFACTURING INFORMATION SYSTEM APPLICATION HAVING A LAYERED ARCHITECTURE, the contents of which are incorporated herein by reference in their entirety including the contents and teachings of any references identified/contained therein. However, as those skilled in the art will appreciate in view of the disclosed exemplary embodiments, the present invention is potentially applicable to a variety of alternative supervisory process control environments that include identifiable data sources that provide real-time process data that drives a set of dynamic graphical elements representing at least a portion of an observed/controlled industrial process.

Referring to FIG. 1, a schematic diagram depicts hosting/hierarchical relationships of components within an exemplary supervisory process control network including a multi-layered supervisory process control and manufacturing information system. Before going into a more detailed description of the exemplary network environment it is generally noted that, in this embodiment, data sources are presented, by way of example, in the form of application objects 105 and 107. The application objects carry out a variety of functions including, receiving status information and carrying out any of a variety of functions at an application level. One such function is generating production event messages upon receiving event notifications originating from other application objects deployed on the system. The event messages are forwarded to production services hosted by yet other networked personal computers attached to an engineering network 119.

The application objects 105 and 107 are identified within a global name table 125 maintained by a configuration database 124 (e.g., Wonderware's Galaxy Repository)—the contents of which are made available to a developer via a visualization application development tool 127 (e.g., Wonderware's INTOUCH software) executing on a configuration PC 120. The visualization application development tool 127, in an embodiment of the present invention, submits queries for particular information residing within the configuration database to facilitate presenting available data sources (e.g., application objects 105) incorporated by a developer into one or more process visualization view/windows for a particular application (e.g., a manufacturing process line). Once built, the process visualization application is potentially deployed to and executed upon any one of a set of workstations connected to the supervisory process control network schematically depicted in FIG. 1.

With continued reference to FIG. 1, a first application server personal computer (PC) 100 and a second application server PC 102 collectively and cooperatively execute a multi-layered supervisory process control and manufacturing information application comprising a first portion 104 and second portion 106. The application portion 104 includes device integration application objects PLC1Network and PLC1. The PLC1Network device integration object facilitates configuring a data access server (e.g., OPC DAServer 116). The PLC1 device integration objects, operating as OPC clients, access data locations within the buffers of the OPC DAServer 116. The data access server 116 and the device integration objects cooperatively import and buffer data from external process control components such as PLCs or other field devices.

In an embodiment of the invention, the requests are submitted by human machine interface software executing upon PCs (e.g., PC 120) connected to network 119 for plant floor information that drives graphical displays representing the plant floor equipment status. The data buffer of the data access server 116 is accessed by the variety of application objects 105 (e.g., PLC1Network, PLC1, App. Objects, etc.) executing upon the personal computer 100. Examples of application objects include, by way of example, discrete devices, analog devices, field references, events/triggers, production events, etc. In the illustrative example, requests for plant floor information and responsive data are passed between the PCs 100 and 102 (on the plant floor) and PC 120 via the network 119.

In accordance with an embodiment of the present invention, application engines host the application objects (via a logical grouping object referred to herein as an "area"). The engines are in turn hosted by platform objects at the next lower level of the supervisory process control and manufacturing information application. The application portions 104 and 106 are, in turn hosted by generic bootstrap components 108 and 110. All of the aforementioned components are described herein below with reference to FIG. 2.

In the exemplary system embodying the present invention, the multi-layered application comprising portions 104 and 106 is communicatively linked to a discretely controlled process. In particular, the first application server personal computer 100 is coupled to a first programmable logic controller 112 via a plant floor network 115. It is noted that the depicted connection from the PC 100 to the PLC 112 via plant floor network 115 represents a logical connection. Such logical connections correspond to both direct and indirect physical communication links. For example, in a particular embodiment, the PLC 112 comprises a node on an Ethernet LAN to which the personal computer 100 is connected. In other embodiments, the PLC 112 is linked directly to physical communication ports on the PC 100.

In the illustrative embodiment set forth in FIG. 1, the PC 100 executes data access server 116. The data access server 116 obtains/extracts process information provided by the PLC 112 and provides the process information to application objects (e.g., PLC1Network, PLC1) of the application comprising portions 104 and 106. The data access server 116 is, by way of example, an OPC Server. However, those skilled in the art will readily appreciate the wide variety of custom and standardized data formats/protocols that are potentially carried out by the data access server 116. Furthermore, the exemplary application objects, through connections to the data access server 116, represent a PLC network and the operation of the PLC itself. However, the application objects comprise a virtually limitless spectrum of classes of executable objects that perform desired supervisory control and data acquisition/integration functions in the context of the supervisory process control and manufacturing information application.

In accordance with embodiments of the present invention, certain application object instances include functionality for issuing triggers corresponding to production events and yet others respond to such triggers to generate and issue production event messages of various types. Examples of such production events include: materials consumed, material produced, material moved, material consumable, production data, equipment, and personnel.

By way of example, the production event trigger messages are passed via a message exchange protocol to an AppEngine2 running on the PC 102. The production event trigger messages are passed to appropriate production event message application objects 107 on the PC 102. In accordance with an exemplary embodiment, the production event message application objects 107, in turn, issue corresponding production event messages to production services 140 [add to FIG. 1] executing in association with a production database 142 on a historian node 144 attached to the engineering network 119. The operation of the production services 140 and production event processing in general are described further herein below.

The supervisory process control and management information application is augmented, for example, by the configuration personal computer 120 that executes a database (e.g., SQL) server 122 that maintains a supervisory process control and management information application configuration database 124 for the application objects and other related information including templates from which the application objects are instantiated. The configuration database 124 also includes a global name table 125 that facilitates binding location independent object names to location-derived handles facilitating routing messages between objects within the system depicted in FIG. 1. The configuration PC 120 and associated database server 122 support: administrative monitoring for a multi-user environment, revision history management, centralized license management, centralized object deployment including deployment and installation of new objects (including production event message objects) and their associated software, maintenance of the global name table 125, and importing/exporting object templates and instances.

Configuration of the applications, including the creation and deployment of application objects, including production event message objects (discussed further herein below), is carried out via an Integrated Development Environment (IDE) 126. The IDE 126 is a utility (comprising potentially multiple components) from which process control and manufacturing information applications, including application objects and engines, are defined, created and deployed to a variety of platforms/engines including, for example, the application server PCs 100 and 102. Developers of a supervisory process control and manufacturing information application, through the IDE 126, carry out a wide variety of application design functions including: importing new object and template types, configuring new templates from existing templates, defining new application objects, and deploying the application objects to the host application engines (e.g., AppEngine1 on the application server PC 100).

The exemplary supervisory control network environment depicted in FIG. 1 also includes a set of operator stations 130, 132, and 134, connected to network 119, that provide a view into a process or portion thereof, monitored/controlled by the supervisory process control and management information application installed and executing as a set of layered objects upon the PCs 100 and 102. A RawMaterial PC 130 provides a representative view enabling monitoring a raw materials area of a supervised industrial process. A ProductionPC 132 presents a representative view of a production portion of the supervised industrial process. A FinishedProductPC 134 provides a representative view of an area of a production facility associated with finished product. Each one of the operator stations 130, 132, and 134 includes a bootstrap host for each of the particular operator station platforms. Each one of the operator stations 130, 132, and 134 includes a view engine that processes graphics information to render a graphical depiction of the observed industrial process or portion thereof.

It is noted that the system depicted in FIG. 1 and described hereinabove is merely an example of a multi-layered hierarchical architecture for a supervisory process control and manufacturing information system for carrying out an exemplary production event messaging system. The present invention is not limited to the particular disclosed application/system, and in fact, need not be implemented in the form of a multi-leveled application as shown in the illustrative example. It is further noted that FIG. 1 is presented as a logical view of the hosting and/or containment interrelations between installed components including software and physical computing hardware. The production events messaging system is suitable for virtually any network topology. For example, the present invention is applicable to a system wherein both configuration utility and supervisory process control visualization applications run on a single computer system linked to a controlled process.

Figure 2:
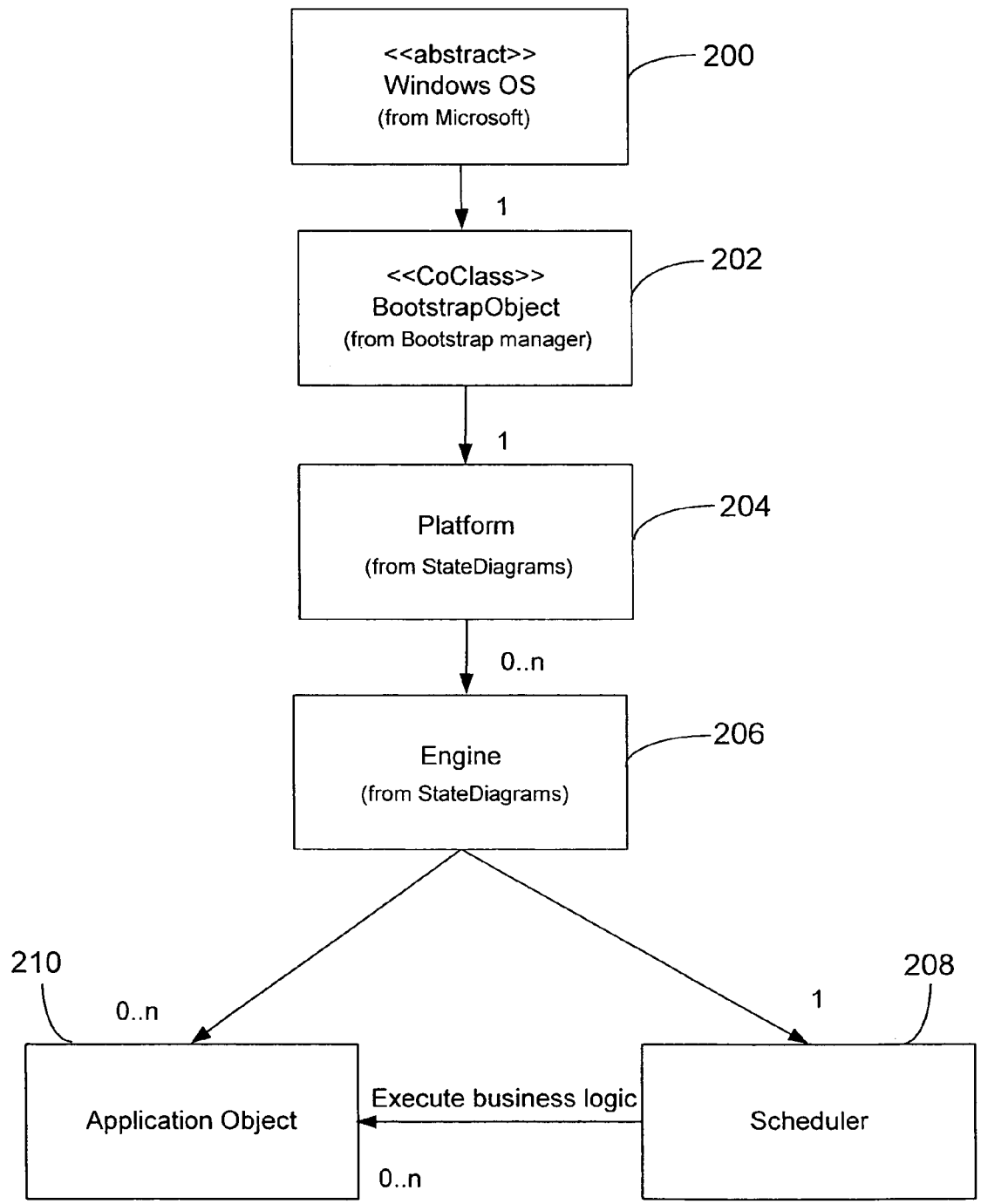
FIG. 2 depicts a multi-tiered object hosting arrangement for hosting applications on platforms and engines within an exemplary system embodying the present invention.

Turning to FIG. 2, a class diagram depicts the hierarchical hosting arrangement of layered software, comprising computer-executable instruction, associated with a computer (e.g., PCs 100 or 102) executing at least a portion of a supervisory process control and manufacturing information application. Each computer executes an operating system 200, such as MICROSOFT's WINDOWS at a lowest level of the hierarchy. The operating system 200, hosts a bootstrap object 202. The bootstrap object 202 is loaded onto a computer and activated in association with startup procedures executed by the operating system 200. As the host of a platform class object 204, the bootstrap object 202 must be activated before initiating operation of the platform class object 204. The bootstrap object 202 starts and stops the platform class object 204. The bootstrap object 202 also renders services utilized by the platform class object 204 to start and stop one or more engine objects 206 hosted by the platform class object 204.

The platform class object 204 is host to one or more engine objects 206. In an embodiment of the invention, the platform class object 204 represents, to the one or more engine objects 206, a computer executing a particular operating system. The platform class object 204 maintains a list of the engine objects 206 deployed on the platform class object 204, starts and stops the engine objects 206, and restarts the engine objects 206 if they crash. The platform class object 204 monitors the running state of the engine objects 206 and publishes the state information to clients. The platform class object 204 includes a system management console diagnostic utility that enables performing diagnostic and administrative tasks on the computer system executing the platform class object 204. The platform class object 204 also provides alarms to a distributed alarm subsystem.

The engine objects 206 host a set of application objects 210 that implement supervisory process control and/or manufacturing information acquisition functions associated with an application. The engine objects 206 initiate startup of all application objects 210. The engine objects 206 also schedule execution of the application objects 210 with regard to one another with the help of a scheduler object 208. Engine objects 206 register application objects 210 with the scheduler object 208 for execution. The scheduler object 208 executes application objects relative to other application objects based upon a configuration specified by a corresponding one of the engine objects 206. The engine objects 206 monitor the operation of the application objects 210 and place malfunctioning ones in a quarantined state. The engine objects 206 support check pointing by saving/restoring changes to a runtime application made by automation objects to a configuration file. The engine objects 206 maintain a name binding service that binds attribute references (e.g., tank1.value.pv) to a proper one of the application objects 210.

The engine objects 206 ultimately control how execution of associated ones of the application objects 210 will occur. However, once the engine objects 206 determine execution scheduling for application objects 210, the real-time scheduling of their execution is controlled by the scheduler 208. The scheduler 208 supports an interface containing the methods RegisterAutomationObject( ) and UnregisterAutomationObject( ) enabling engine objects 206 to add/remove particular ones of the application objects to/from the scheduler 208's list of scheduled operations.

The application objects 210 include a wide variety of objects that execute business logic facilitating carrying out a particular process control operation (e.g., turning a pump on, actuating a valve), and/or information gathering/management function (e.g., raising an alarm based upon a received field device output signal value) in the context of, for example, an industrial process control system. Examples of process control (automation) application objects include analog input, discrete device, and PID loop objects. A class of the application objects 210 act upon data supplied by process control systems, such as PLCs, via device integration objects (e.g., OPC DAServer 118). The function of the integration objects is to provide a bridge between process control/manufacturing information sources and the supervisory process control and manufacturing information application.

The application objects 210, in an exemplary embodiment, include an application interface accessed by the engine objects 206 and the scheduler 208. The engine objects 206 access the application object interface to initialize an application object, startup an application object, and shutdown an application object. The scheduler 208 uses the application object interface to initiate a scheduled execution of a corresponding application object.

Figure 3:
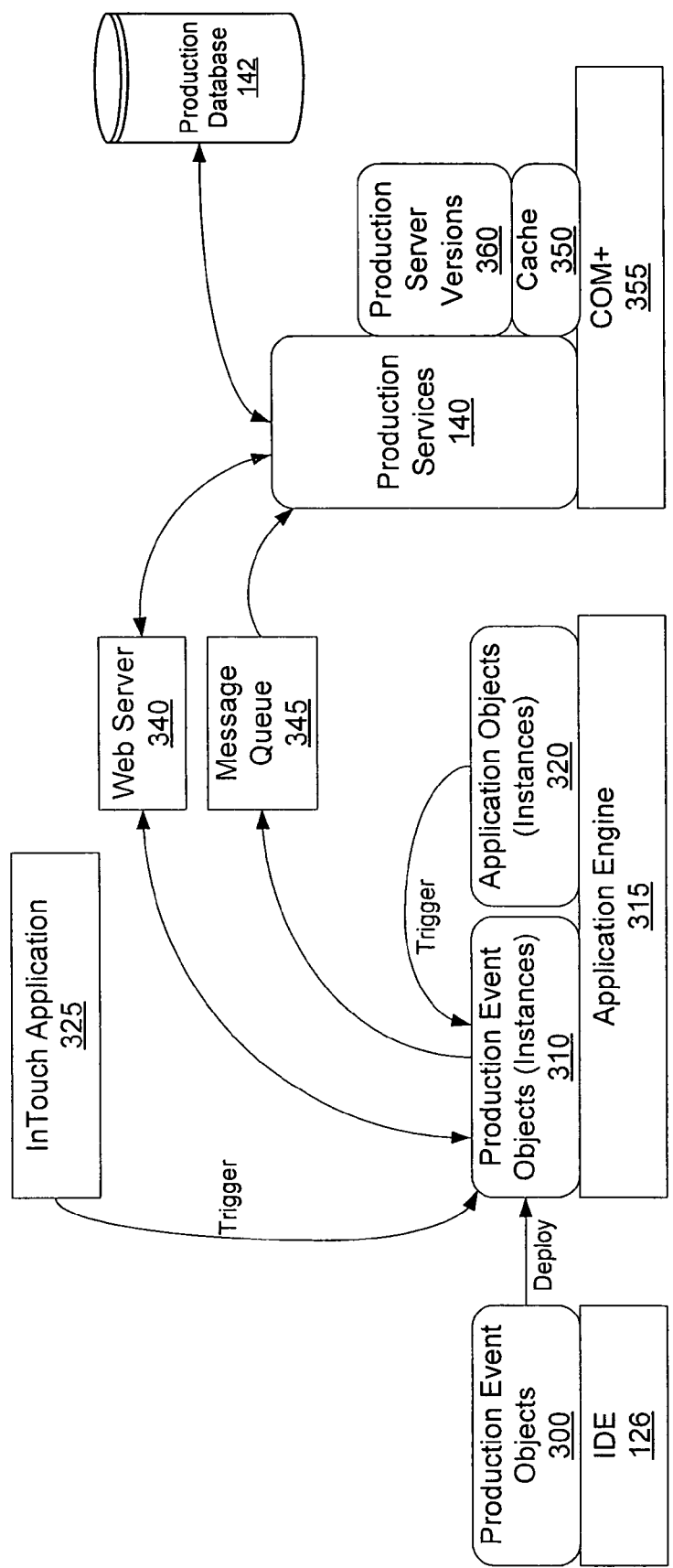
FIG. 3 depicts a high level architecture for defining, deploying, and executing production event objects for reporting and recording production events in a system.

Having described the primary components of an exemplary supervisory process control and manufacturing information network environment, attention is directed to a high level architectural view of a production events system schematically depicted in FIG. 3. Such system is, by way of example, configured, deployed and executed in a supervisory discrete process control environment of the type depicted in FIGS. 1 and 2.

Turning to FIG. 3, the IDE 126 facilitates creating and configuring a set of production event application objects 300. The application objects 300 are created, by way of example, from a production event object template toolbox supporting a variety of production event types defined under ISA-95 including: material consumed actual, material produced actual, material moved actual, material consumable actual, production data, equipment actual, and personnel actual. It is noted that configuration of production event application objects 300 includes both: (1) configuring derived child templates that are thereafter stored as children of parent templates within the template toolbox associated with the IDE 126, and (2) configuring instances of production event objects. Thus, particular application-specific production event configurations can be stored and re-used multiple times to create particular application-specific production event object instances. In an exemplary embodiment, the derivation/inheritance relationships between production event object templates are depicted within a template toolbox graphical user interface in the form of an expanding/contracting hierarchical tree.

The aforementioned production event object types can be divided into "material" and "status" event objects. Material event objects facilitate recording material production events and include the following exemplary object types (corresponding to templates provided in the template toolbox of the IDE 126): MaterialConsumableActual, MaterialConsumedActual, MaterialMovedActual, and Material Produced. Status event objects facilitate recording information about a defined production segment. Status event object types include, for example, the following (corresponding to templates provided in the template toolbox of the IDE 126): Equipment Actual, Personnel Actual, and Production Data.

Types of Production Event Objects

The MaterialConsumableActual production event object template defines an object for identifying consumables used during a defined production segment. The information collected and provided in a corresponding production event object includes: a material, a quantity, and unit of measure of the consumable material consumed. The consumables may not normally be identified in a bill of materials or they might be items which are not individually accounted for in a defined production segment. However, these items might result in direct charges that are considered in costing of a production segment. Depending on the type of industry, consumables can include utilities such as electricity and water, common chemicals, or catalysts. The MaterialConsumableActual production event template uses at least a location or a material ID attribute to identify material.

The MaterialConsumedActual production event object template defines an object for identifying materials consumed during a defined production segment. The material consumed would normally be identified in a bill of material as raw material, purchased material or the output of another process segment. The MaterialConsumedActual production event object uses at least one of the following attributes to identify the material consumed: location, lot, material ID, serial number list, and sub lot. A quantity attribute is also recommended to define how much of the resource was consumed.

The MaterialMovedActual production object template defines an object for recording the movement of material with a single production event which is a combination of a Material Consumed Actual event and a Material Produced Actual event. The MaterialMovedActual object tracks movement of an identified material—for example, the movement of material from a receiving location to a storage silo on a production line. In this case, the Material Moved Actual event records consumption of material from the receiving location and production of material in the storage silo. To identify the destination of the material, this object must use at least one of the following attributes: destination location, destination lot, destination material ID, destination serial number list, or destination sub lot. To identify the source of the material, the MaterialMovedActual object uses at least one of the following attributes: source location, source lot, source material ID, source serial number list, and source sub lot. A quantity attribute is also recommended to define how much of the material was moved.

The MaterialProducedActual production object template defines an object for recording creation of a final product as the output of a production segment. The MaterialProducedActual production object uses at least one of the following attributes to identify the material produced: location, lot, material ID, serial number list, and sub lot. A quantity attribute is recommended to define how much of the material was produced.

Having described the set of exemplary material production event object templates supported by the IDE 126, attention is directed to the exemplary set of "status" production event object templates.

The EquipmentActual production object template defines an object for recording actual equipment use information to be associated with a unit of production. For example, an EquipmentActual production object potentially contains a list of equipment properties associated with a production segment.

The PersonnelActual production object template defines an object for recording personnel related information for a production segment. For example, a PersonnelActual production object potentially specifies an employee's identification number and workstation associated with a production segment.

The ProductionData production object template defines an object for recording discrete values of production data corresponding to a point in a production process. For example, a ProductionData production object potentially facilitates recording a start time and a stop time of a defined production segment. Alternatively, the ProductionData production object records values at the end of a step in a production process.

In an alternative embodiment, a Generic production object is supported. The Generic production object template is a base object that provides only production attributes that are required for all production objects. A user defines any customized production object type by deriving a child template from the generic production object template and designating extended production attributes (described herein below) and then saving the derived child template to the template toolbox of the IDE 126. The generic production object is used, for example, to gather information that is not associated with any of the above-described production events and store the data in a table within the production database 142.

The production event object types identified above include a set of included production attributes. Each type of production event object has its own set of associated production attributes. Examples of such production attributes include: location, material ID, comment, personnel list, process segment ID, production request ID, quantity, segment response ID, unit of measure, lot, sub lot, serial number list, etc. Some production attributes are common to all production event object types (templates). Other attributes are used in only certain ones. Some of the attributes are mandatory while others are not. For example, each production event object type includes a Production Request ID, a Process Segment ID, and a Segment Response ID. These three production attributes are used to identify the production process and provide linkages between related production events stored within other particular tables of the production database 142 (described herein below with reference to an exemplary database schema depicted in FIG. 12).

Configuring Production Attributes

The IDE 126 supports configuring the production attributes for event objects (templates and instances). A user configures the set of production attributes for a production event object via the IDE 126. During configuration the user, by way of example, designates which ones of a set of potential production attributes will be logged (i.e., stored in tables within the production database 142). Furthermore, the user designates an input source or initial value for the attribute.

Configuring General Production Object Options

Figure 4:
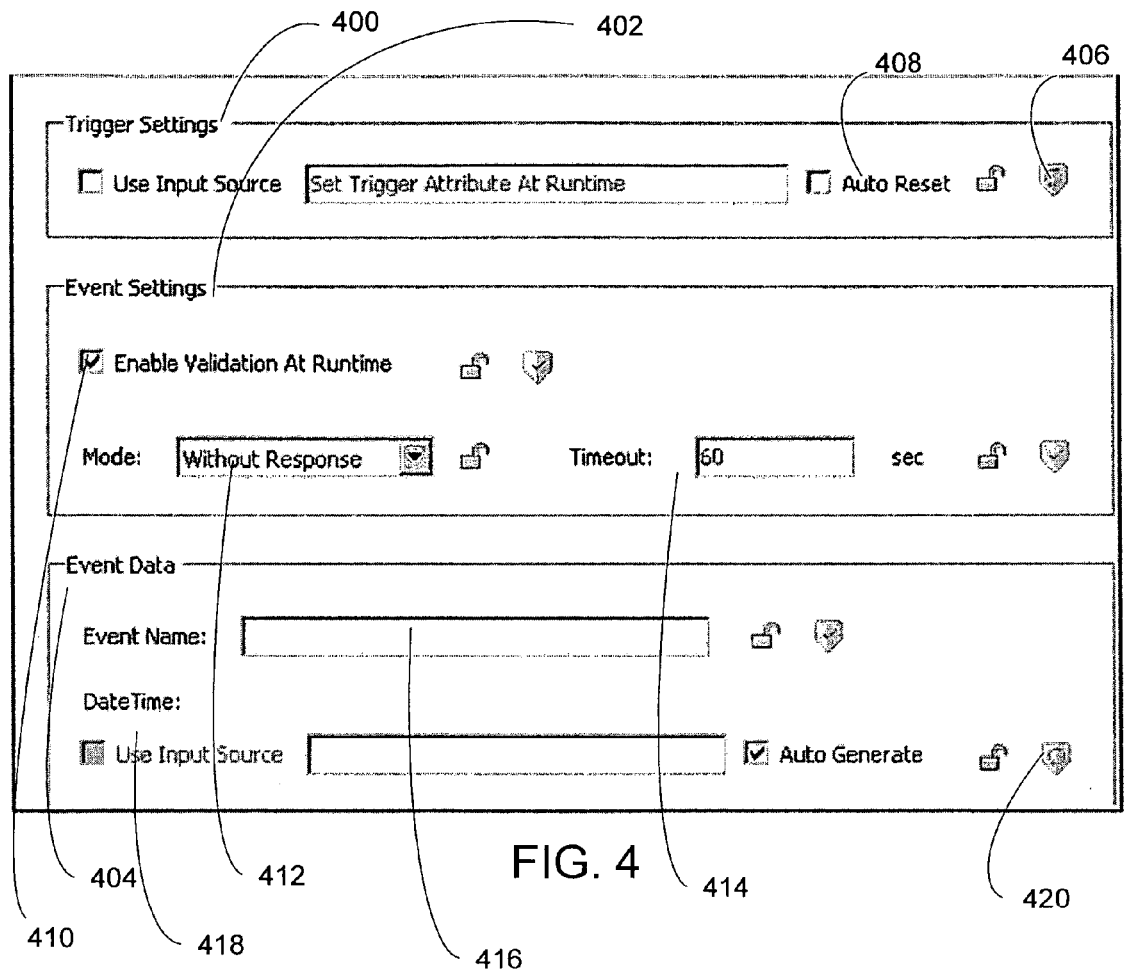
FIG. 4 is an exemplary user interface for configuring trigger settings, event settings and event data for a production event object.

Turning briefly to FIG. 4, the IDE 126 also supports configuring trigger settings, event settings and event data. In the exemplary production object configuration interface (used to configure all production event objects), a set of user-configurable fields is divided into Trigger Settings 400, Event Settings 402, and Event Data 404. The Trigger Settings 400 fields enable a user to define how a production event object is activated or triggered when deployed and executed in a runtime environment. In the Trigger Settings 400 area, there are two options available for the trigger. The first option specifies the trigger method. If a Use Input Source select box is not selected, then the MyPEMEvent.Trigger is used to trigger the event. Selecting the Use Input Source box enables using an input source as the trigger for the event. Clicking a browse icon 406 launches an attribute browser dialog for selecting an attribute as the input source. Selecting an auto reset check box 408 automatically resets an object attribute trigger state. This is useful for events that you want to trigger without a response from the event object.

The Event Settings 402 fields define how the production event object uses validation when deployed and how it communicates with the production services 140 (with/without response) when triggered.

In the Event Settings 402 fields, selecting an Enable Validation At Runtime box 410 enables validation on all selected attributes within event messages issued when the production event object is deployed and triggered. Only attributes selected on a validation configuration dialog (see, FIG. 6) are enabled for validation. Configuration of validation and validating production event messages is described herein below. A mode list box 412 enables selecting the mode of communication between the production event object and the production services 140 when a production event message is issued. Selecting "Without Response" designates an asynchronous communication mode. Selecting "With Response" designates a synchronous mode for communicating event messages, and the object waits for a response the production service node to handle any validation errors. A timeout box 414 specifies the amount of time the production object will wait for a response from production services after transmitting a message in the With Response mode before registering a communication error and resending the previously transmitted message.

The Event Data 404 field configures an "event name" provided when the data is recorded and a date and time when the event is triggered. An Event Name box 416 enables a user to designate a name for a production event associated with the production object. A Date Time area 418 enables a user to select a Use Input Source option to set a "datetime" attribute or select Auto Generate to automatically generate the date and time for a triggered event. A user clicks a Browse icon 420 to select an attribute from an Attribute Browser dialog box.

Configuring Extended Production Attributes

The production event handling system disclosed herein also supports extensions to pre-configured production attribute sets defined for the production event object types described herein above. Such extensions, referred to herein as "extended production attributes", add additional information that is potentially stored within the tables of the production database 142 or alternatively the extended production attributes are used to interpret other information provided in a production event message passed to the production services 140. In an exemplary embodiment, extended production attributes are inherited from parent templates.

Figure 5:
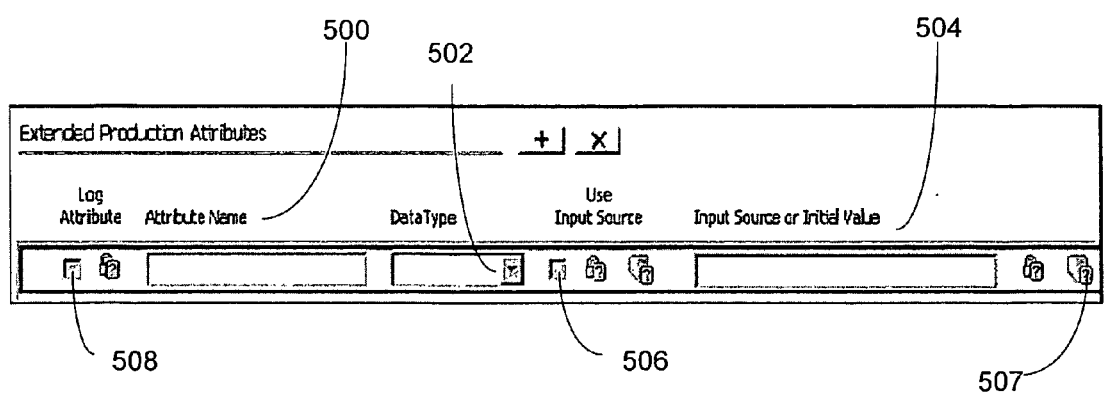
FIG. 5 is an exemplary user interface for configuring extended production attributes on a production event object.

Turning briefly to FIG. 5, an exemplary user interface for designating extended attributes for a production event object is depicted. Any number of extended production attributes can be added to a production event object. Extended production attributes are defined for a production event object by invoking an Add Extended Attribute dialog having, by way of example, an interface of the type depicted in FIG. 5. Thereafter, an attribute name is entered in an Attribute Name box 500. A type of data is thereafter selected by a user from a list of data types presented in a Data Type drop-down list box 502. An Input Source or Initial Value box 504 stores either an initial value for the extended attribute or an input source (if the Use Input Source checkbox 506 has been designated by the user). A browse icon 507 provides access to an attribute browser dialog for enabling a user to search for a particular input source for the extended production attribute's value. A log attribute checkbox 508 enables a user to designate whether or not the extended attribute will be stored in the production database 142 when the event object is triggered. Control buttons are also included for adding another extended production attribute (+) or removing an existing extended production attribute (−).

Configuring Validation of Production Event Information

In an exemplary embodiment, a message schema utilized to build production event messages has been extended to support defining validation to be performed on information provided in the production attribute values and extended production attribute values contained in messages generated by the production event objects. The IDE 126 supports defining a set of validation settings for information provided in event messages created by the production event objects. The validation settings are utilized by the production services 140 and even an originating client to validate the information contained in production event messages. Such validation is utilized by the production services 140 to ensure the validity of event information prior to storing the production event information in appropriate tables of the production database 142.

In an exemplary embodiment, the world batch forum schemas (ISA-95) have been selected for the format of the production event message received and processed by the production services 140. Alternative embodiments of the invention are potentially based on other standards—or even no standards at all. However, the standardized format of information provided according to the ISA-95 schema aids defining generalized rules for validating data contained within production event messages. Furthermore, in embodiments of the invention "context" validation is performed with regard to the integrity of structures containing the production event data (e.g., ensuring completeness of the data sets provided in a message). In an exemplary embodiment, the internal structure of received information is validated by an XML parser associated with the production services 140. The XML parser includes a definition for the form of particular messages and attribute values contained in the messages.

In an exemplary embodiment, message validation is built into the production event objects. At runtime, once an S95 production event object is loaded with data, a method can be called on the production event object to validate itself. This validation can be called on the client-side, server-side, or on both the client and server sides. Validation that can only be performed on the server-side will not be attempted on the client-side. For example, an "exists in database table/column" validation is executed only on the server-side where the value can be compared to an appropriate table/column combination in the production database 142.

Data Validation

During runtime a validation operation is potentially performed on each attribute value of each production event message to verify that the contained data meets validation criteria specified by the user during configuration time via the IDE 126.

Figures 6, 7:
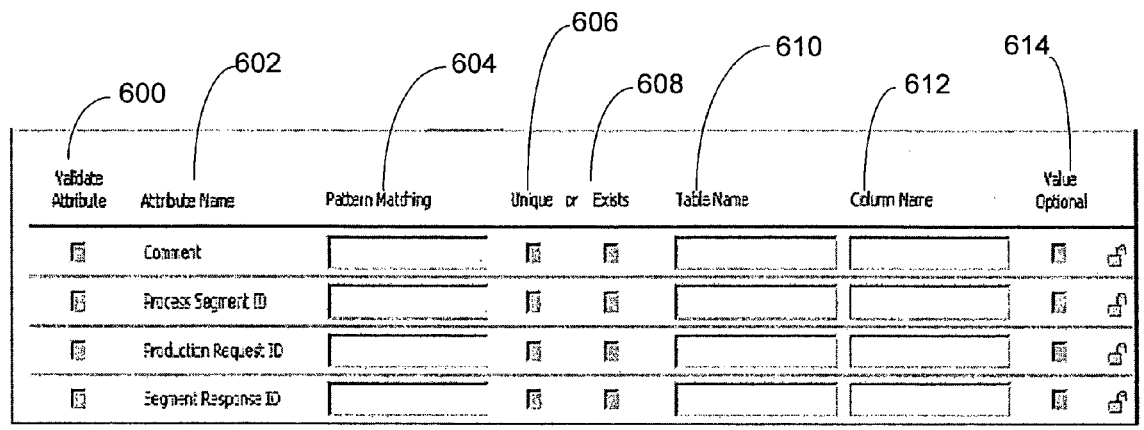
FIG. 6 is an exemplary user interface for configuring validation on attributes of a production event message.
FIG. 7 is table summarizing a set of rules for a requirement to include at least one piece of information that comprises another form of validation applied across multiple attributes of a production event message.

Turning to FIG. 6, data validation is described with reference to an exemplary validation configuration user interface for a production event object. In the exemplary embodiment, validation is potentially defined for both production attributes and extended production attributes. The validation configuration user interface thus lists all production attributes and extended production attributes by name. The headings of the exemplary validation configuration user interface identify a set of configurable validation options associated with three types of data validation. In the illustrative embodiment, users define the following three types of validation: Pattern Matching, Unique or Exists, and Value Optional. Pattern Matching and Value Optional can only be defined when the production event attribute is a string data type.

Each of the input fields of the exemplary validation configuration user interfaces are described below. A validate attribute field 600 designates whether or not validation will be performed on an associated production event attribute. An attribute name field 602 is automatically filled by the validation interface based upon a current set of defined production event attributes defined for the production event object.

A pattern matching field 604 supports defining a pattern for information provided for the attribute (which must be a string parameter value). Specified by a macro-based positional string template, the pattern dictates what valid characters each position in the string can take on. The pattern is made up of a series of alphanumeric and certain non-alphanumeric characters and wildcard symbols (e.g., #, &, and @). The interpretation of the wildcard symbols is as follows: #—position must contain digit, &—position must contain letter, @—position must contain alphanumeric. In embodiments of the invention, certain non-alphanumeric characters are supported for pattern matching such as: dash (-) and underscore (_) characters that are both valid and are interpreted literally. On the other hand spaces and commas are NOT allowed.

A unique field 606 and an exists field 608 are mutually exclusive validation tests that require comparing (on the server side) a provided attribute value in a received message to a set of values currently stored within a column of a table within the production database 142 identified in Table field 610 and Column field 612. With regard to the "Exists" validation operation, the attribute value is compared to a set of values in the specified table/column to ensure that the particular value exists. By way of example, an "exists" test is performed in instances where it is critical that an attribute's value exist as an entry in an external data source (table/column). For example, if an operator is required to enter an Order Number, and for reporting purposes it must be valid, the exists validation mechanism invokes a query of the external data source to verify the data is contained within the designated table/column. The "Unique" validation operation verifies that a provided attribute value is not identical to any entry within the specified table/column of an external data source. In an exemplary embodiment, in the case of an external data source (i.e. a table or data element outside of the Production Database), Microsoft SQL Server's "Linked Servers" technology is utilized to enable configuring external data sources to appear as tables internal to the production database 142. Once configured as such, the external data sources are accessed by validation mechanisms as if they were tables in the production database 142. Thus, validation operations can be applied to MICROSOFT EXCEL spreadsheets, Text Files, etc.

The configuration user interface also includes a Value Optional field 614. By default the validation mechanism requires every specified attribute (value) to contain some data. The attribute value cannot be NULL or empty or unspecified. However, if the Value Optional field is checked, then an absence of a specified value for the attribute will not cause the validation mechanism to fail.

Context Validation

In addition to the user-configurable "data" validation operations, an exemplary embodiment of the present invention supports a set of "context" validation operations on production event messages that are internally configured for particular types of production event objects. In contrast to data validation (which takes into consideration the actual individual values specified for production event attributes), context validation evaluates the content of multiple production event attributes within a single message.

By way of a particular example, one form of context validation ensures that a message includes at least one attribute of a set of production attributes in a production message specifies an actual value. By way of a particular example, the production event messages generated by material-related production objects (i.e., MaterialConsumableActual, MaterialConsumedActual, MaterialProducedActual, and MaterialMovedActual) must include at least one value of the set of optional attribute values to uniquely identify a material affected by a reported event. The matrix depicted in FIG. 7 identifies, for each of the four material-related event messages, the set of optional attribute values from which at least one value must be specified to pass a context validation operation. Without the context validation, data associated with a Material Produced Actual event could be written to the production database 142 that doesn't contain the data needed to identify the material that was produced during the reported event. The above example is merely exemplary and it is contemplated that a variety of context validation operation types will be incorporated into various alternative embodiments of the production event reporting/recording system described herein.

Returning to FIG. 3, after configuring the set of production event (application) objects 300, the user deploys corresponding production event object instances 310 to an application engine 315 running on an application node (e.g., AppEngine2 on ApplicationServer2 PC 102). The production event object instances 310 are thereafter executed in a runtime environment. In the runtime environment the production event object instances 310 create and issue event messages for consumption by the production services 140 in response to received triggering events from local and non-local application objects 320 and applications (e.g., InTouch application 325). As noted above in the description of configuration of triggers with reference to an exemplary configuration interface presented in FIG. 4, production event objects are for example, attributes on the objects themselves or an I/O source.

During runtime the triggers for the production event object instances 310 on the application engine 315 are evaluated on each scan. If the trigger is high, then the triggered production event object creates a production event message. When creating the production event message, the triggered production event object collects the values and associated validation configurations of the production event attributes designated to be "logged" during configuration of the production event object. During collection of logged attributes the production object retrieves an input value from a specified location. However, if the attribute is not defined as an input the value currently stored in that attribute will be used. Thereafter, the production event message is issued by the production event object 310 to the production services 140 for deposit within appropriate tables of the production database 142. In the case of an original (new) message, a new Message ID is generated to identify the message. In an exemplary embodiment the production services 140 operate in a COM+ server 355 environment wherein the production services 140, based upon version identification information embedded within the received production event message, invoke a version of a production server. The production server version, implementing a particular version of a production event message schema, parses and validates production event information contained in the received production event message. The validated information is tabled by the production server in the production database 142.

In accordance with an exemplary embodiment, two production event transfer modes are supported. In a Without Response (Asynchronous) message transfer mode, the production event object issues the event message to a Message Queue service 345 and does not wait for any form of confirmation or error response. Any errors that occur in the processing of the message contents are logged within a table on the production database 142. On the other hand, if a With Response (Synchronous) message transfer mode is designated, then the production event object will wait for a response message from a Web Server 340 that receives event messages and passes the received messages to the production services 140. The response from the production services 140 via the Web Server 340 indicates any errors that occurred during processing of the message on the server side. For example, the response will indicate any validation errors (including detailed information regarding the cause of a validation error) arising from applying the configured validation criteria to the logged attributes within the production event message. The synchronous and asynchronous transfer modes are described further herein below with reference to FIGS. 8 and 9.

Two Supported Messaging Modes

The production events information reporting/recording system disclosed herein supports both asynchronous (without response) and synchronous (with response) messaging modes between production event objects 310 and the production services 140. In "with response" mode (see, FIG. 9), the production event object receives a response from the production services 140, via the Web server 340 informing the message sender of the success/failure status of not only receipt of the message, but also the successful parsing, validation, and storage of the information contained within the message. In the "without response" mode (see, FIG. 8), the message is sent via a unidirectional communications path (e.g., via a message queue), and no response is sent back to the issuer of the production event message by the production services 140.

It is up to the production services 140 to record/report any errors arising during processing the contents of a received production event message from the production event objects 310. "With response" mode is useful for situations where there is user interaction (e.g., via a monitor). The "without response" mode is useful for when the client just wants to send a message and not worry about it. Caching of S95 information at the service level occurs in both situations.

Figure 8:
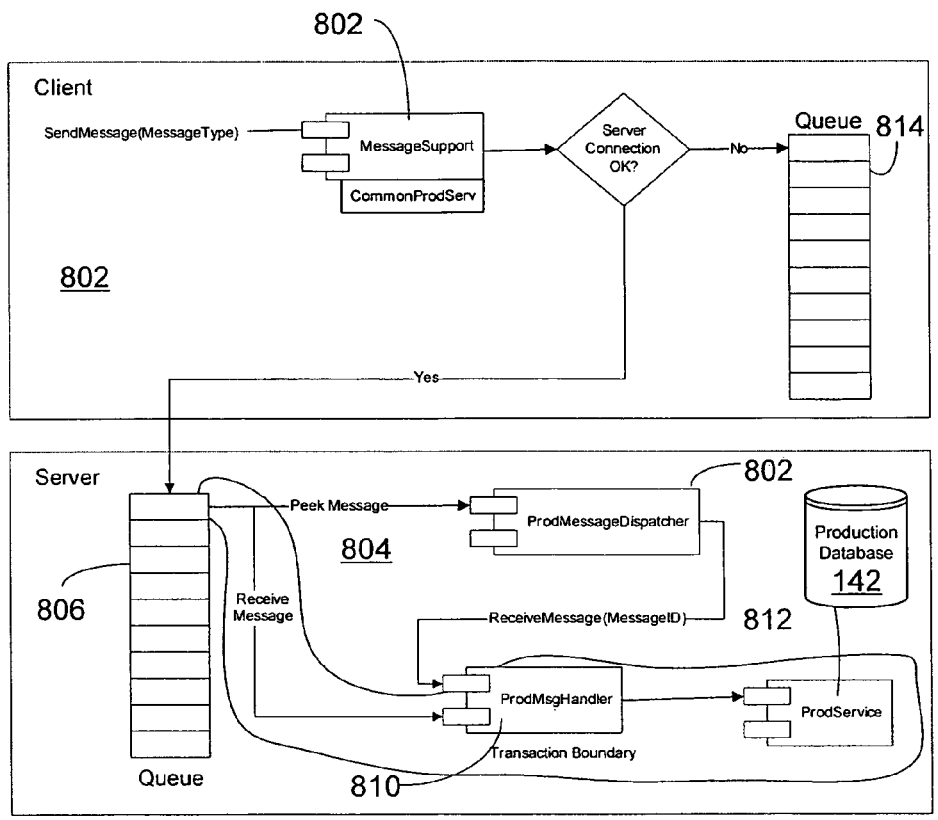
FIG. 8 is a high level diagram illustratively depicting a form of message transmission where no response is provided by production services.

Turning to FIG. 8, while operating in the "without response" mode, by way of example, a SendMessage method is invoked on a MessageSupport component 800 on a client 802. The MessageSupport component 800 sends a designated message to a server 804 using a MICROSOFT Message Queuing (MSMQ) service 345. The MSMQ service 345 is configured for guaranteed/transaction delivery. Once the MSMQ service 345 delivers the message from the client 802 to the server queue 806, a production message dispatcher service 808 (a MICROSOFT WINDOWS service) sees the message on the queue 806 and calls a production message handler service 810 which retrieves the message off of the queue 806. As will be explained further herein below with reference to FIG. 11, the handler service 810 parses at least a portion of the retrieved message, and invokes an instance of an appropriate production server 812, of potentially multiple supported versions of the production server, to process the production event message.

Retrieving the message from the queue and calling the production server 812 are performed within the context of a single transaction (as indicated by the transaction boundary drawn on FIG. 8) to ensure the message is not lost. If an error occurs, it is up to the production server 812 to report/record the error in some way. It is noted that the client 802 also includes a queue 814 for storing messages in the event that the connection between the client 802 and the server 804 is disrupted.

Figure 9:
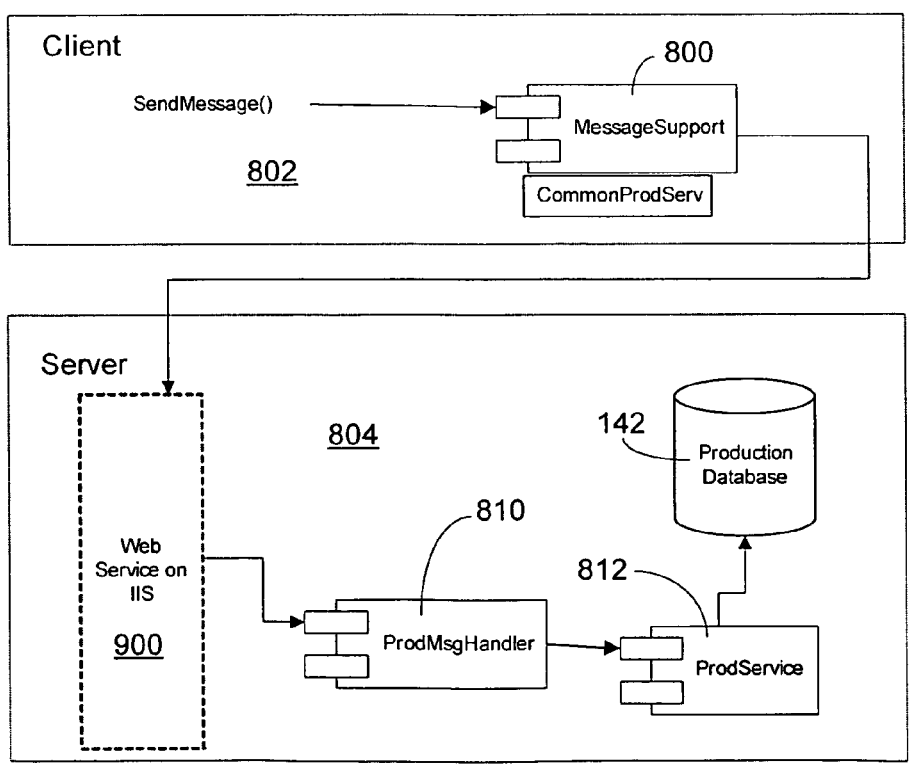
FIG. 9 is a high level diagram illustratively depicting a form of message transmission where a response is provided by production services.

Turning to FIG. 9, in the "with response" mode, a SendMessage call is invoked on the MessageSupport component 800 with a designated message. The MessageSupport component 800 sends the message to the server 804 using a call to a Web service 900 operating on the server 804. The web service 900 on the server 804 in turn calls the handler service 810. The handler service 810 parses a portion of the received production event message (e.g., message extensions described herein below) and invokes an appropriate production server 812 version to process the event information contained in the message. If any errors are detected by the production server 812 (e.g., validation errors), then the errors are reported back to the production event object that issued the message.

The "with response" mode supports resending a previously failed production event message with a same message ID. Two resend scenarios are supported. In the first, a same message is resent because no response was received within a timeout period or some other error prevents the production object from receiving a response to a production event message. Such an error is detected when a production event object starts up and the status is busy. In such a case, the last sent message is resent with the same message ID. In the second scenario, a message is resent in response to an error reported in a received response. In such case a resubmit attribute is set to true and the production event object is retriggered. In both cases, the production event object reconstructs the message from current information which may have changed since the previous (failed/erroneous) transmission.

Returning to FIG. 3, the production services 140 receive production event messages via one of the two message transfer modes described above. Upon receipt, the production services 140 (including a particular production server version) parse the contents of the message according to a specified schema specified using XML. The production services 140, via the invoked production server 812 version, thereafter perform validation on each attribute. As explained previously herein above, in an illustrative embodiment, validation on each production event parameter potentially includes data validation (e.g., pattern matching, exists/unique, and value optional) and/or context validation (e.g., includes data in at least one of a set of attributes). In the exemplary embodiment, the configured validation definitions performed on passed attribute values are contained within the production event messages. In an exemplary embodiment, the validation definitions are provided in accordance with extensions to a production message schema implemented by a production server version from potentially multiple production server versions 360 maintained by the production services 140. The validation definition extension to the production event message schema, and other extensions, are described further herein below.

If no errors are detected, then the production services 140 tables the validated information provided by the received production event message in the production database 142. However, if validation errors are detected in a "without response" mode message, the production services 140 write an error entry to a production event message error table on the production database 142. On the other hand, if the error was detected in a "with response" mode message, then the error is written to the originating production event object's ".ErrorMessage" and ".ErrorCode" entries and presented to a user.

Validation Object Classes

Validation is implemented through a combination of client-side and server-side code modules, and a set of specific extensions (described further herein below) to the ISA-95 standard XML schema. The extensions to an XML base schema embodying the ISA-95 standard for reporting/recording production events to implement validation are generally grouped into two areas: extensions defining validation rules to be run against the production event message data, and extensions enabling the results of the validation to be added to the production event message.

As noted previously above, validation rules are specified within a production event message to define user-configured and system-specified validation to be performed on production attributes and extended production attributes within the production event message. A validation rule is a combination of a Validation Extension and a Rule definition. A validation extension is a 'shape' that defines how a specific type of validation rule is defined. For example, a "Quality" validation extension defines properties that must be specified to fully describe a quality validation rule. Validation extensions are themselves XML-based, and leverage the format (only) of the Business to Manufacturing Markup Language (B2MML) standard, which facilitates generically housing validation and value-specific extension data.

The validation rule is the data that is applied to a validation extension by validation code on either the client-side or server-side. When a production event object is triggered, and a production event message is created and processed, the validation rules extensions in the message are used by the client side to perform early validation for data existence and quality. Validation rules are used by the server side to perform all other validation (e.g., validating against the contents of a particular table/column in the production database 142) as described earlier in the application.

With regard to production event message schema extensions relating to validation results, the results of validation execution are stored within a Validation Error extension of a production event message. The error data stored in a validation error extension to a production event message is used by the production objects to report validation errors to the user within the runtime object when a "With Response" (synchronous) production event messaging mode is used to transfer production event messages between production objects and the production services 140. On the other hand, the validation error extension data is used by the production services 140 to store the validation results in the production database 142 when the "Without Response" (asynchronous) mode is used.

In an exemplary embodiment, the following set of classes is used to implement the above-described validation of production event messages.

ValidationError: a helper used to hold information about a Validation Error. An array of these are potentially returned within a TraceResponseMessage object.

ValidationExtension: an internal base class that is applied to several of the generated Business to Manufacturing Markup Language classes to allow them to have Validation and other value specific extension data. QualityType and ValueType are examples of generated classes that derive from this class.

ValidationExtensionData: an internal class that helps the serialization/deserialization of the ValidationExtension base class to/from an Any XML element.

ValidationHelper: an internal class that is used by validate methods to validate each field.

ValidationRule: a helper class that is used to hold information about a Validation Rule.

Two interfaces are also defined:

IValidationError: an interface making the ValidationError class accessible via COM.

IValidationError: an interface making the ValidationRule class accessible via COM.

Also one enumeration is defined, ValidationErrorTypeEnum, that contains a list of all the supported validation failure types.

Production Event Process Identifier Caching

With continued reference to FIG. 3, in an exemplary embodiment, the production services 140 maintain a cache 350 of previously stored production information and associated GUIDs corresponding to entries within tables of the production database 142. In an illustrative embodiment of the invention, the IDs for particular pieces of information stored in the tables of the production database 142 and GUIDs assigned to the rows of the tables containing the information are stored in a cache to minimize the need to access the potentially very large tables to retrieve the GUIDs when building links between the entries of different pieces of production information stored in separate locations (e.g., tables, rows) within the production database 142. Furthermore, when a new message is received, the production services 140 first look for the needed linkage (e.g., GUID) information in the internal cache prior to accessing the database for information.

In accordance with a particular illustrative embodiment, resources (materials, equipment, and people) are manipulated by the production processes. Production events, those used for processes and resources (e.g., materials, equipment, and people), carry identifiers associated with production processes (e.g., Production Request, Process Segment Definition, Segment Response, etc.). The production processes in many cases are related. A Production Request constitutes an order to produce a finite amount of an identified material (e.g., provide 100 gallons of chocolate milk). A Process Segment corresponds to a particular task performed to complete a production request. A Segment Response corresponds to a particular instance of an executed task. Corresponding Ids are assigned by both a client and production database to identify each distinct instance of a Production Request, Process Segment, and Segment Response.

The production services 140 cache the production event process identifier information in the cache 360. In an illustrative embodiment, the cached identifiers (and GUIDs assigned by the production database 142) are for the Production Request and Process Segment of each received event message. Each received event message has an "Id" field which is optionally supplied by the data user collection performed in the app server. At the database level, each of these identifiers (Production Request ID and Process Segment ID) represents a unique entry within an appropriate table within the production database 142, and a globally unique identifier (GUID) is used by the database 142 to specifically identify each table entry, and the data it contains.

Figure 10:
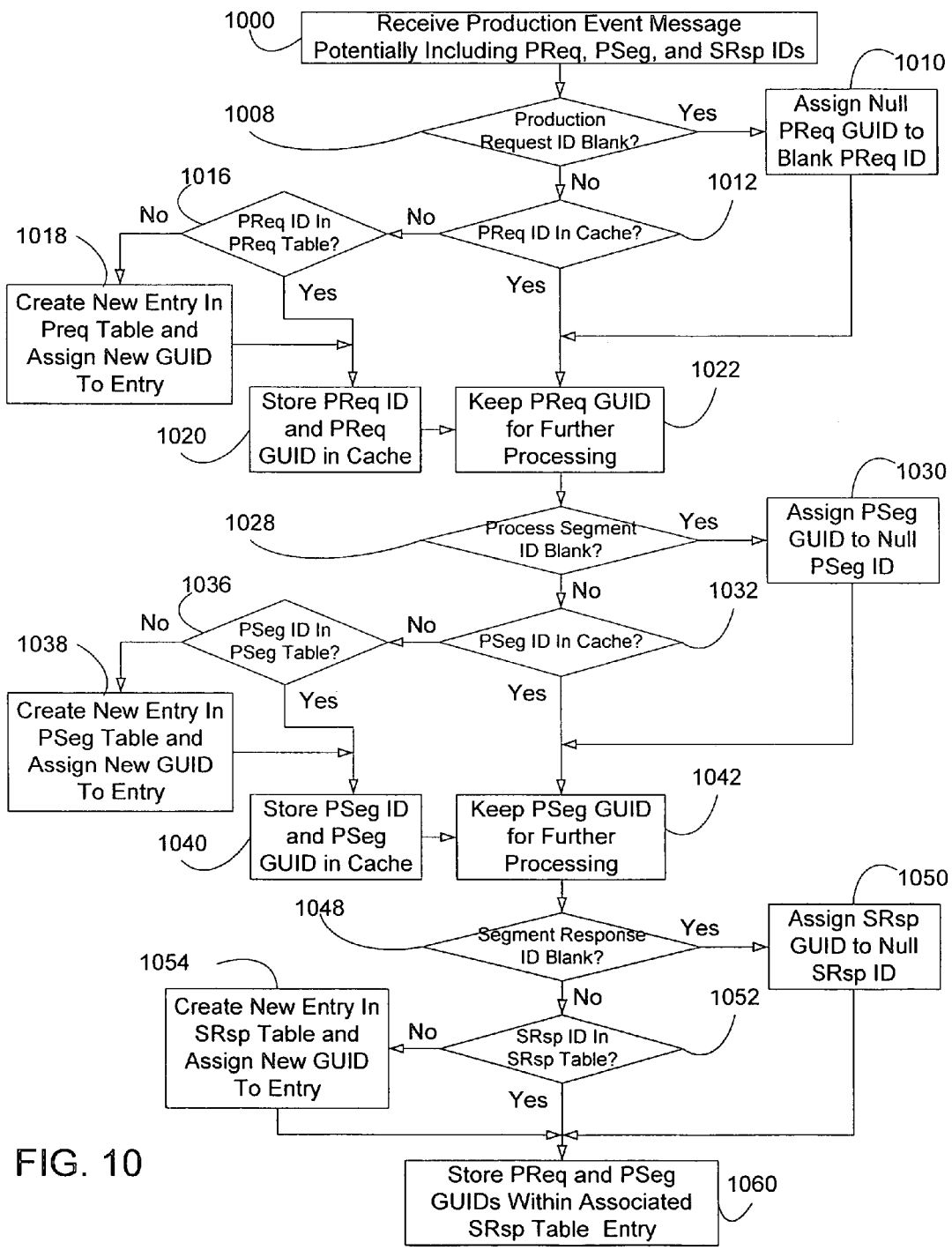
FIG. 10 is a flowchart summarizing a caching operation involving GUIDs used to complete a record in a table of a production database.

In a particular database schema for the production database 142 (see, FIG. 12 described herein below), the Production Request ID and the Process Segment ID are used to correlate/link and thereafter locate data associated with a Segment Response identifier in a received event message. Because the correlation algorithm potentially requires time/resource consuming database searches and lookups, a technique, summarized below with reference to FIG. 10, is implemented for storing and accessing database entry identifications in the cache 360 to reduce the need to access the tables containing the Production Request and Process Segment IDs when the production services 140 are obtaining and storing information linking a Process Segment to related entries (rows) within Production Request and Process Segment tables.

The following summarizes an exemplary cache management method for reducing accesses to tables to retrieve information (GUIDS) linking an entry in a Segment Response table to associated Production Request and Process Segment tables. Initially, during step 1000, the production services 140 receive a production event message containing production event data. The message potentially includes a Production Request ID, a Process Segment ID, and a Segment Response ID (furnished by the production event object). Not all are required, but if they are provided, they will be used by the cache to expedite correlating and locating records.

During step 1008, if the Production Request ID field in the event message is blank (i.e. no value provided), the value is considered absent and will be represented as a NULL. Control passes to step 1010 wherein, a new Production Request table GUID is assigned to the NULL Production Request ID. While this action doesn't provide more context than was provided with the Production Event Message, is does ensure proper data correlation during reporting. If this was not done, the user would not be able to retrieve this message's data when associating it with other related events. Control then passes to step 1022.

If the Production Request ID field in the event message is not blank (i.e., an ID value was provided), then control passes to step 1012 wherein the production services look for an entry in the cache 350 corresponding to the provided Production Request ID. If the cache look-up succeeds, then processing moves to step 1022 described herein below. If the cache look-up fails, then control passes to step 1016 wherein the Production Request ID is applied to the Production Request table within the production database 142.

If the Production Request table look-up succeeds during step 1016, then control passes to step 1020 wherein the Global Unique Identifier (GUID) corresponding to the Production Request ID entry in the Production Request table is returned from the database 142, and both the Production Request ID and the Production Request ID's GUID are stored in the cache 350 for future reference during step 1012. If the Production Request table look-up fails during step 1016 (i.e., the Production Request ID isn't in the Production Request table), then a new entry/row is created in the Production Request table corresponding to the Production Request ID, and a new GUID is assigned to the new Production Request table entry corresponding to the Production Request ID. Control then passes to step 1020 wherein the new GUID and Production Request ID are stored in the cache 350 for future reference during step 1012.

During step 1022, the Production Request GUID and ID for the received production event message are stored in memory (even if the GUID value is for a NULL Production request ID) for reference during the final stages of the event message processing (i.e., providing Production Request and Process Segment GUIDS to a Segment Response table entry corresponding to the received production event message).

The steps for handling Process Segment IDs and GUIDs is substantially the same as the ones described above for processing Production Request IDs and GUIDs. During step 1028, if the Process Segment ID field in the event message is blank (i.e. no value provided), the value is considered absent and will be represented as a NULL. Control passes to step 1030 wherein, a new Process Segment table GUID is assigned to the NULL Process Segment ID. While this action doesn't provide more context than was provided with the Production Event Message, is does ensure proper data correlation during reporting. If this was not done, the user would not be able to retrieve this message's data when associating it with other related events. Control then passes to step 1042.

If the Process Segment ID field in the event message is not blank (i.e., an ID value was provided), then control passes to step 1032 wherein the production services look for an entry in the cache 350 corresponding to the provided Production Request ID. If the cache look-up succeeds, then processing moves to step 1042 described herein below. If the cache look-up fails, then control passes to step 1036 wherein the Process Segment ID is applied to the Process Segment table within the production database 142.

If the Process Segment table look-up succeeds during step 1036, then control passes to step 1040 wherein the Global Unique Identifier (GUID) corresponding to the Process Segment ID entry in the Process Segment table is returned from the database 142, and both the Process Segment ID and the Process Segment ID's corresponding GUID are stored in the cache 350 for future reference during step 1032. If the Process Segment table look-up fails during step 1036 (i.e., the Process Segment ID isn't in the Process Segment table), then a new entry/row is created in the Process Segment table corresponding to the Process Segment ID, and a new GUID is assigned to the new Process Segment table entry corresponding to the Process Segment ID. Control then passes to step 1040 wherein the new GUID and Process Segment ID are stored in the cache 350 for future reference during step 1032.

During step 1042, the Process Segment GUID and ID for the received production event message are stored in memory (even if the GUID value is for a NULL Process Segment ID) for reference during the final stages of the event message processing (i.e., providing Production Request and Process Segment GUIDS to a Segment Response table entry corresponding to the received production event message). Control then passes to step 1050.

Figure 12:
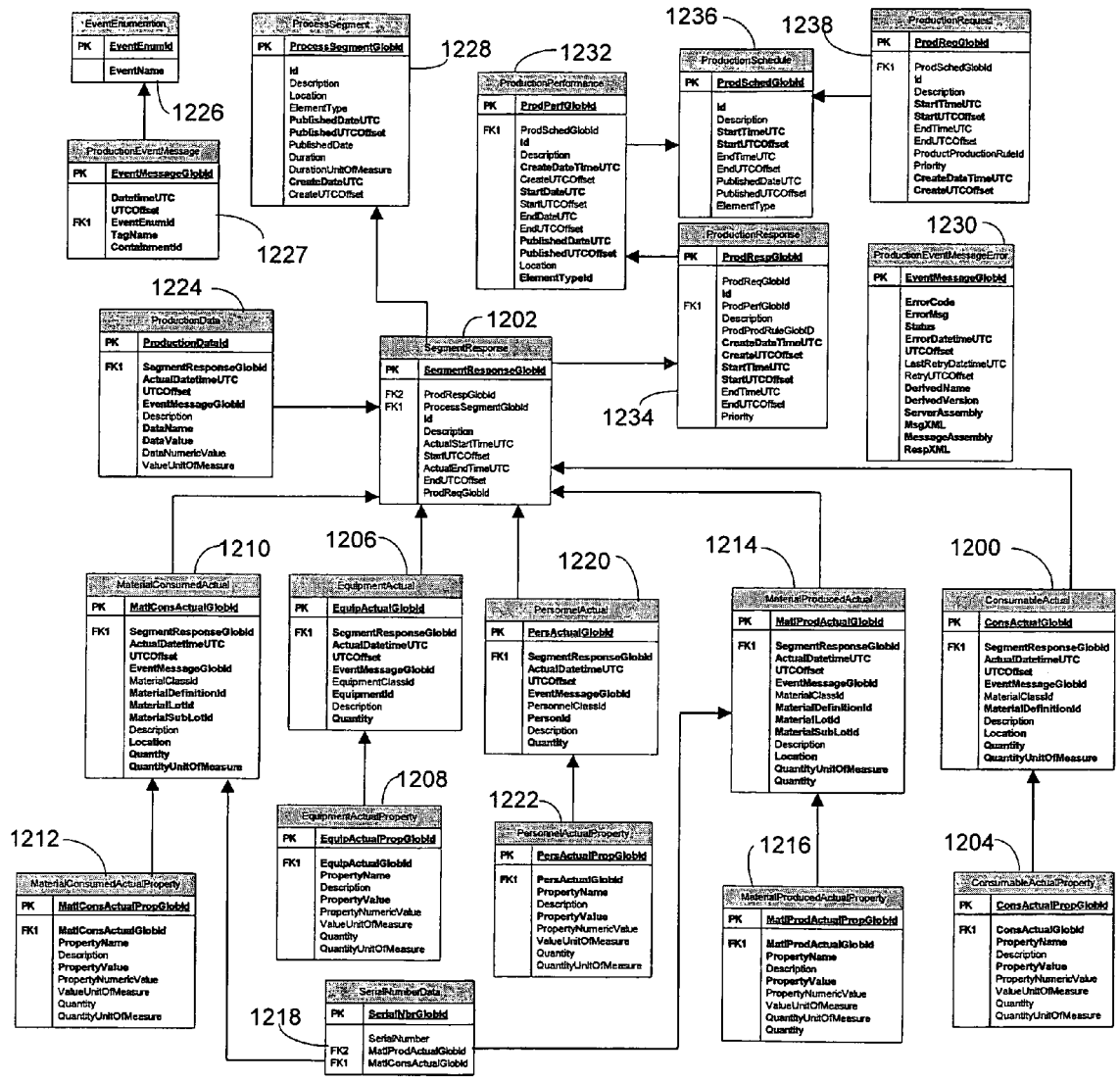
FIG. 12 summarizes an exemplary set of tables making up a production database.

Before commencing the discussion regarding step 1050, it is noted that in the illustrative embodiment including a database comprising a set of tables organized/linked in the manner summarized in FIG. 12, a Segment Response ID is used in combination with an associated Production Request ID/GUID and Process Segment ID/GUID to retrieve event data from the production database 142. Therefore, in the illustrative embodiment, these three elements are tied together within the database schema. These three database elements are tied together primarily through an entry in the Segment Response table of the production database 142 that ultimately contains references, though some may be indirect, to the associated Production Request and Process Segment table entries. To tie the Production Request and Process Segment table entries to a Segment Response table entry, the Production Request ID and the Process Segment ID must be known at the time the Segment Response ID is assigned a new entry in the Segment Response table. Determining the identifiers for the corresponding Production Request and Process Segment table entries at event-data-insert time could take a significant amount of database processing resources. Therefore, the cache 350, populated with information regarding the Production Request and Process Segment IDs/GUIDs in the manner described above, is referenced to potentially obtain the GUIDs for the Production Request ID and the Process Segment ID specified in a current production event message. When step 1050 is reached, the GUIDs corresponding to the Production Request ID and the Process Segment ID for a received production event message are known. The remaining steps tie the Production Request and Process Segment GUIDs to the Segment Response ID.

During step 1048, if the Segment Response ID is blank (i.e. no value provided) in the received production event message, then control passes to step 1050 and the Segment Response ID value is considered absent and will be represented as a NULL for purposes of generating a Segment Response table GUID. Control then passes to step 1060.

If, during step 1048, the Segment Response ID in the event message is not blank (i.e. a value was provided), then control passes to step 1052 wherein the Segment Response ID value is looked up in the Segment Response table in the production database 142 (note: Segment Response IDs are not cached). If the look-up of the Segment Response ID succeeds, then control passes to step 1060.

However, if the Segment Response ID is not located in the Segment Response table during step 1052, then control passes to step 1054 wherein a new table entry is created for the specified Segment Response ID in the Segment Response table of the production database 142. A new row, with a new GUID assigned to it, is assigned to the Segment Response ID. The new GUID and Segment Response ID are returned for further processing and control passes to step 1060.

During step 1060 the previously retrieved production database GUIDs corresponding to the Production Request ID and the Process Segment ID are associated with the Segment Response ID for the production event message (which ties them all together). An entry/row in the Segment Response table corresponding to the Segment Response ID is updated to include the GUIDs for the Production Request ID and the Process Segment ID in the production database 142. Thus, a user is able to access the content of corresponding entries in the Production Request and Process Segment tables through the Segment Response ID GUID and the content of the Segment Response table corresponding to the Segment Response ID GUID.

Extensions to a Production Event Message Schema

Another aspect of the production events reporting/recording system disclosed herein is the content and processing of the event messages provided by the production event objects to the production services 140. In particular, extensions to a production messaging standard (e.g., ISA-95) are defined/supported that include: global identifiers for relating context and linking production data to an original request, functionality such as moves, personnel lists and other such data. The extensions, and modifications to the set of supported extensions, are facilitated by specifying a particular version of a production server (e.g., an XML-based event message parser) within a metadata extension to the base message format. In particular, a metadata extension within a production event message identifies a version of a message format (XML) definition to be used by the production services 140 to extract data content from the event message. In the illustrative embodiment, the version is specified by identifying a "ServerAssembly" corresponding to a particular version of the production services 140.

Exemplary extensions to the production message schema are described herein below. The base version of a production event message schema is acquired from the world batch forum, and several extensions have been described below to support additional functionality—including versioning of production service software (server assemblies) for parsing the content of extended production event message schemas that may change over time.

1. Production Event Message Origin Extensions

A production event message itself has an identity (a GUID) and may be named. The message GUIDs are used throughout the production database 142 schema to record the relationship of the message event to corresponding ISA-95 event data stored in the production database 142. The following are examples of parameters specified via Message Origin Extensions.

MessageID—This GUID must be set by the derived class. The server will verify that the MessageID is unique for a reasonable period of time. The intended purpose of the MessageID is to make sure the same transaction is not recorded twice by the production services 140. If a client is unsure that a transaction occurred successfully, it can resend the message with the same MessageID. The production services 140 will return an error if it recently successfully processed a message including the same MessageID. To keep the server from registering a "duplicate MessageID" error, the client can set the Retry property before resending the message. The retry attribute setting informs the production service 142 to process the message if it doesn't have a duplicate, and ignore the retry message if the message was already processed successfully.

MessageName—Specifies an optional and arbitrary name for this message.

2. Production Services Event Message Handling Extensions

Production services event message handling extensions facilitate carrying out certain message handling management tasks associated with receiving and handling messages by the production services 140, including possibly re-sent messages.

Retry—Described in the MessageID section above, specifies that the client is resending a message using a previous MessageID.

MessageData—Specifies an optional array of string data to send within this extension to the production event message.

MessageSrc—Specifies an optional piece of information about the origin of this message. For Example MessageSrc could be "MaterialProducedActual".

MessageDate—An optional field for specifying a date with the message.

3. Production Server Version Identification Extensions

In an illustrative embodiment, metadata extensions to a base production event message schema describe the infrastructure of the production event message itself. Such metadata includes information identifying a particular one of potentially multiple production server versions that will be used to process the content of a received production event message. This particular set of extensions, in combination with functionality built into the production message handler 810 for determining and invoking an appropriate one of a set of production servers supported by the production services 140, facilitates supplementing/modifying the set of supported production attributes in new production servers while maintaining backward compatibility with older production server versions. Creating and processing a production event message in a system supporting potentially multiple production server versions is described herein below with reference to FIG. 11.

ServerAssembly—Specifies a .NET assembly name for a production service that should process this message.

BaseVersion—Specifies a simple version for this ProductionMessage class. Production Messaging and Production Services can verify that they will understand the incoming message.

DerivedVersion—Specifies a simple version for the derived class. Production Messaging and Production Services can verify that they will understand the incoming message.

DerivedName—Specifies a simple name for the derived class.

4. Validation Extensions

Validation rules, discussed extensively hereinabove, are designated within extension portions of the production event messages. The following extensions are specified to support transferring validation configuration information with the messages to be validated. Each of the attributes identified below is provided for each production event attribute within the transferred message.

ValidationEnabled—Specifies whether the validation rule should be applied or not to the attribute. The default is False.

DBTableName—Specifies the table part of a table/column pair that will be checked to see if an attribute's value exists or doesn't exist in the Production Database.

DBColumnName—Specifies the column part of a table/column pair that will be checked to see if an attribute's value exists or doesn't exist in the Production Database.

DBExists—Specifies if the table/column pair should be checked for "existence" or "not existence" of an attribute's value.

Pattern—Specifies a pattern to apply against an attribute's value.

CanBeNull—Specifies whether an attribute's value can be null or empty string. By default this is False.

ClientData—Arbitrary value passed by the client. This value will be returned in the ValidationError object if validation fails.

ValueKey—Internally defined value that represents the piece of information being validated. This value will be returned in the ValidationError object if validation fails.

5. Manufacturing Electronic Records Management and Special Handling Extensions Comments for events and serial numbers, not specified by the ISA-95 messaging standard, are also supported in extensions.

Comment—Specifies a comment to pass as extension data with the derived class.

SerialNumbers—Specifies an array of serial numbers to pass as extension data with the derived class.

TxTime—Specifies the time this transaction occurred.

6. Response Message

This is a response message to an S95 document posted to a web service. It is outside the scope of the S95 schema with elements documented here since they relate to the original message.

MessageID—See above.

MessageAssembly—See above.

BaseVersion—See above.

DerivedVersion—See above.

DerivedName—See above.

ErrorCode—Specifies a numeric value describing the response. Typically, this will be zero for success and be non-zero for errors.

ResponseMsg—Specifies a string describing the response. Typically, this will be empty for success and contain an error description for errors.

RetryOrigMessage—Specifies the original message should be retried because it is unclear if the Traceability Service was able to process it successfully.

ValidationError

ErrorMsg—An error message describing why validation failed.

ErrorPosition—This property will contain a zero based position in the string where the pattern failed to match.

ErrorType—Specifies the type of validation error that occurred.

ErrorValue—This contains a string representation of the value that failed validation.

ValidRule—A copy of the original ValidationRule object that caused this validation failure. See above for addition info.

Figure 11:
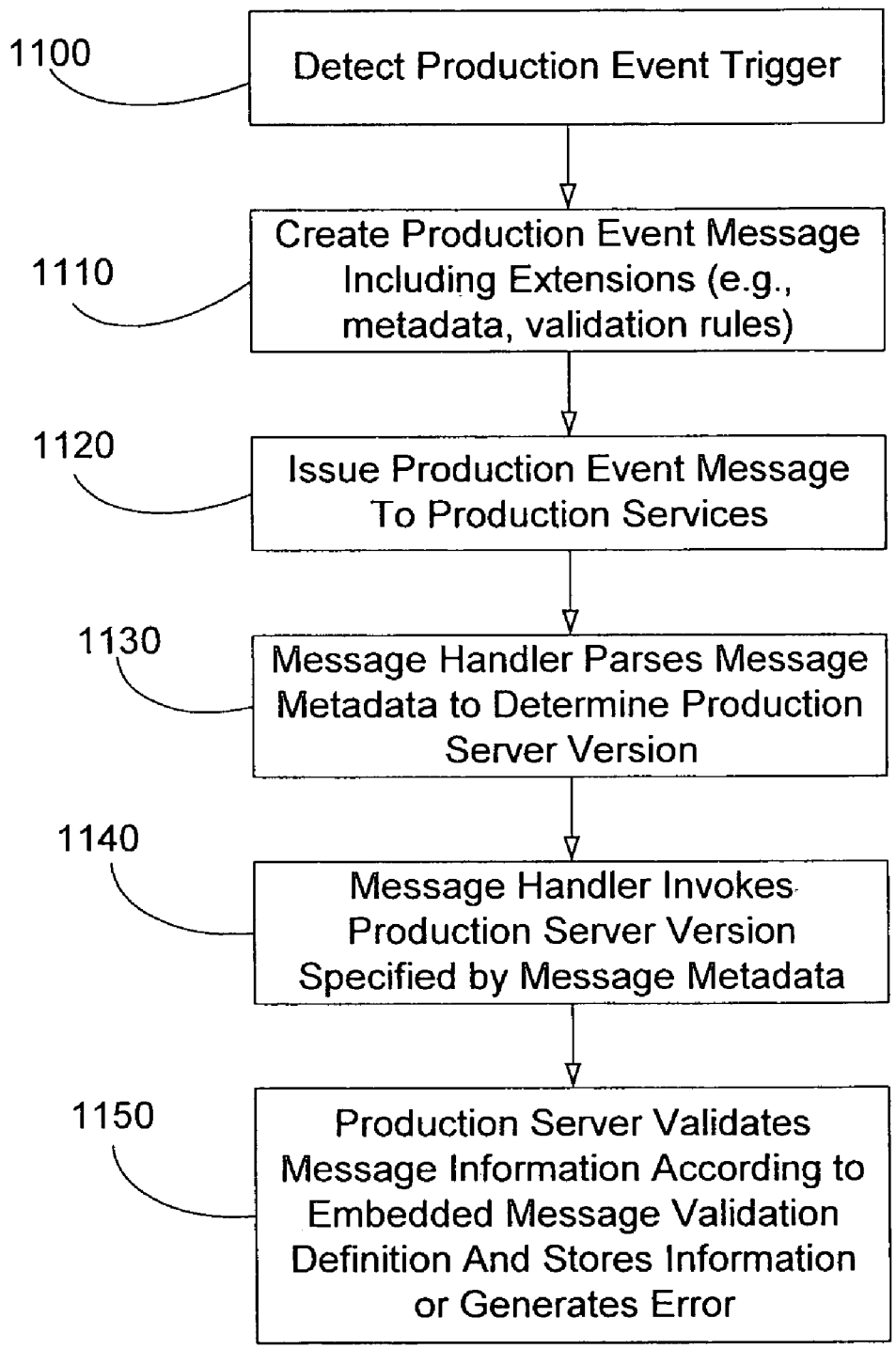
FIG. 11 is a flowchart summarizing a set of steps for handling a received production event message by selecting one of potentially multiple production servers based upon metadata furnished within the production event message.

Turning to FIG. 11, an exemplary set of steps are summarized that describe creating and processing a production event message that includes metadata extensions that specify a particular production server version to be used by the production services 140 to parse and table information provided in the production event message. Initially, during step 1100 a production event object is triggered to create a production event message. In response the production event object creates a production event message during step 1110. The production event message includes a set of production event attributes and a set of message extensions. As noted above the set of message extensions includes validation extensions and metadata identifying a particular version of production server to be used to parse and validate the attribute information contained within the message. Thereafter, during step 1120 the production event message is transmitted to the production services 140 via one of the two supported messaging protocols (i.e., with/without response).

Thereafter, during step 1130 the handler service 810 parses the metadata within the received production event message to determine a proper production server version to invoke to process the production event information contained within the received message. Next, during step 1140 the handler service invokes a production server version of multiple production server versions supported by the production services 140. Thereafter, during step 1150, the invoked production server version processes the production event attributes contained within the received message according to an associated XML-based production event message schema. During step 1150 the production server validates the received message data in accordance with a validation definition provided via message information extensions contained within the received message itself. The production server either tables the production event information contained in the message (if validation was successful) or logs an error (if validation revealed an error). Based upon the type of messaging (with/without response), the production services 140 either store the error in an error table in the production database 142 (without response) or returns a failure message with an error code. In an exemplary embodiment, the production server instance (e.g., production server 812) invoked by the handler service 810 persists only for the single message transaction.

Thus, a method has been described for processing production event messages that potentially embody different types/formats of information based upon particular messaging schemas. In accordance with an embodiment of the present invention, version metadata is included in the production event message to identify a particular messaging version. The messaging version information is utilized by the production services 140 to identify and invoke a particular version of multiple supported production server versions to process the production event message. The production server instance persists only for the duration of the production event message transaction. However, in alternative embodiments, the production server versions persist beyond the scope of a production message transaction.

Turning to FIG. 12, an exemplary production database schema is depicted for the production database 142 that stores information associated with production event messages generated by production event objects in response to production event triggers and tabled (after validation) by the production services 140.

A ConsumableActual table 1200 stores a set of records supporting a view of a basic S95 Consumable Actual object with global identifiers and UTC (Coordinated Universal Time) columns added. Each entry includes a foreign key referencing a row in a SegmentResponse table 1202 (described herein below) with which the entry is associated.

A ConsumableActualProperty table 1204 stores a set of records supporting a view of a basic S95 Consumable Actual Property object with global identifiers and UTC columns added. Each entry includes a foreign key referencing a row in the ConsumableActual table 1200 with which the entry is associated.

An EquipmentActual table 1206 stores a set of records supporting a view of a basic S95 Equipment Actual object with global identifiers and UTC columns added. Each entry includes a foreign key referencing a row in the SegmentResponse table 1202 with which the entry is associated.

An EquipmentActualProperty table 1208 stores a set of records supporting a view of the basic S95 Equipment Actual Property object with global identifiers and UTC columns added. Each Property row is linked via a foreign key to a single Equipment Actual row.

A MaterialConsumedActual table 1210 stores a set of records supporting a view of the basic S95 Material Consumed Actual object with global identifiers and UTC columns added. Each entry includes a foreign key referencing a row in the SegmentResponse table 1202 with which the entry is associated.

A MaterialConsumedActualProperty table 1212 stores a set of records supporting a view of the basic S95 Material Consumed Actual object with global identifiers and UTC columns added. Each Property row is linked to a single row in the MaterialConsumedActual table 1210.

A MaterialProducedActual table 1214 stores a set of records supporting a view of the basic S95 Material Produced Actual object with global identifiers and UTC columns added. Each entry includes a foreign key referencing a row in the SegmentResponse table 1202 with which the entry is associated.

A MaterialProducedActualProperty table 1216 stores a set of records supporting a view of the basic S95 Material Produced Actual Property object with global identifiers and UTC columns added. Each Property row is linked to a single row in the MaterialProducedActual table 1214.

A SerialNumberData table 1218 stores a set of records supporting a view of all serial numbers recorded to the production database 142. Serial numbers are material properties that are categorized in their own table. Each serial number entry has a link to a row in either the MaterialConsumedActual table 1210 or the MaterialProducedActual table 1214 that contains the serial number as part of the event.

A PersonnelActual table 1220 stores a set of records supporting a view of the basic S95 Personnel Actual object with global identifiers and UTC columns added. Each entry includes a foreign key referencing a row in the SegmentResponse table 1202 with which the entry is associated.

A PersonnelActualProperty table 1222 stores a set of records supporting a view of the basic S95 Personnel Actual Property object with global identifiers and UTC columns added. Each Property row is linked to a single row in the PersonnelActual table 1220.

A ProductionData table 1224 stores a set of records supporting a view of the basic S95 Production Data object with global identifiers and UTC columns added. Each entry includes a foreign key referencing a row in the SegmentResponse table 1202 (described herein below) with which the entry is associated.

An EventEnumeration table 1226 stores a set of records supporting a view that is a list of event names with the identifiers for the event used as a reference.

A ProductionEventMessage table 1227 stores a set of records supporting a view of the unique events stored in the database 142. Each entry includes a foreign key referencing a row in the EventEnumeration table 1226 with which the entry is associated.

A ProcessSegment table 1228 stores a set of records supporting a view of the basic S95 Process Segment object with global identifiers and UTC columns added.

A ProductionEventMessageError table 1230 stores a set of records supporting a view of messages with validation errors which need to be reviewed.

A ProductionPerformance table 1232 stores a set of records supporting a view of the basic S95 ProductionPerformance object with global identifiers and UTC columns added. Each entry includes a foreign key referencing a row in a ProductionSchedule table 1236 (described below).

A ProductionResponse table 1234 stores a set of records supporting a view of the basic S95 Process Segment object with global identifiers and UTC columns added. Each entry includes a foreign key referencing a row in the ProductionPerformance table 1232.

A SegmentResponse table 1202 stores a set of records supporting a view of the basic S95 Segment Response object with global identifiers and UTC columns added. Each entry includes a set of foreign keys referencing a row in each of the ProcessSegment table 1228, ProductionResponse table 1234, and ProductionRequest table 1238 (described herein below).

A ProductionSchedule table 1236 stores a set of records supporting a view of the basic S95 Production Schedule object with global identifiers and UTC columns added.

A ProductionRequest table 1238 stores a set of records supporting a view of the basic S95 Production Request object with global identifiers and UTC columns added. Each entry includes a foreign key that references a row in the ProductionSchedule table 1236.

It is noted that the above described production database 142 schema is exemplary. In view of the wide variety of potential uses for the data provided via the production event messages it is foreseen that alternative embodiments will utilize alternative sets of tables to store relevant information in the database 142.

In view of the many possible embodiments to which the principles of this disclosed production event reporting/recording system may be applied, it should be recognized that the embodiments described herein with respect to the drawing figures are meant to be illustrative only and should not be taken as limiting the scope of invention. For example, those of skill in the art will recognize that some elements of the illustrated embodiments shown in software, stored on computer-readable media in the form of computer executable instructions, may be implemented in hardware and vice versa or that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A computer system including computer-executable instructions stored on a non-transitory computer-readable medium for providing a production events information recording system for use in a manufacturing environment, the computer system comprising:
    a production database comprising a set of tables for storing production event information;
    a production event object for generating, in response to a triggering production event, a production event message including a set of data corresponding to a production event;
    production database services for processing the production event message generated by the production event object, the production database services including a production server for processing information content within the production event message prior to storing the set of data corresponding to the production event in the production database; and
    a multiple mode production events messaging interface between the production event object and the production database services, wherein the multiple mode production events messaging interface supports both asynchronous and synchronous messaging transactions between the production event object and the production database services.

2. The computer system including the production events information recording system of claim 1 wherein a first mode supporting synchronous messaging transactions utilizes Internet services to transfer production event messages.

3. The computer system including the production events information recording system of claim 2 wherein the production database services, in response to designation of the first mode, generate a response message that is returned to the production event object.

4. The computer system including the production events information recording system of claim 1 wherein the production database services, in response to designation of a second mode supporting asynchronous messaging transaction, generates a result that is stored within a table of the production database.

5. The computer system including the production events information recording system of claim 1 wherein a second mode supporting asynchronous messaging transactions utilizes a message queue to transfer production event messages.

6. The computer system including the production events information recording system of claim 5 wherein the second mode is carried out on a client machine by a message service including a queue for storing messages in the event that a connection between the client machine and a server machine including the production database services is disrupted.

7. The computer system including the production events information recording system of claim 6 wherein a server machine includes:
    a queue, associated with the second mode, for receiving production event messages from the client machine; and
    wherein the production database services include a dispatcher for observing the queue for production event messages.

8. The computer system including the production events information recording system of claim 1 wherein the production database services include a message handler for receiving both asynchronous and synchronous mode production message transmissions.

9. The computer system including the production events information recording system of claim 8 wherein the message handler parses at least a portion of the received message to determine a version of production server to invoke to process the received message.

10. The computer system including the production events information recording system of claim 1 further comprising a production event object configuration interface including an interface enabling a user to designate one of multiple supported messaging modes of the multiple mode production events messaging interface.

11. The computer system including the production events information recording system of claim 1 wherein the production server, in handling a message provided in a synchronous messaging mode, reports any event information errors detected during processing back to the production event object.

12. The computer system including the production events information recording system of claim 1 wherein the production event object, upon receiving a reported event information error for a previously sent production event message, reconstructs the previously sent production event message using current production event information.

* * * * *